United States Patent Office 3,606,494
Patented Sept. 20, 1971

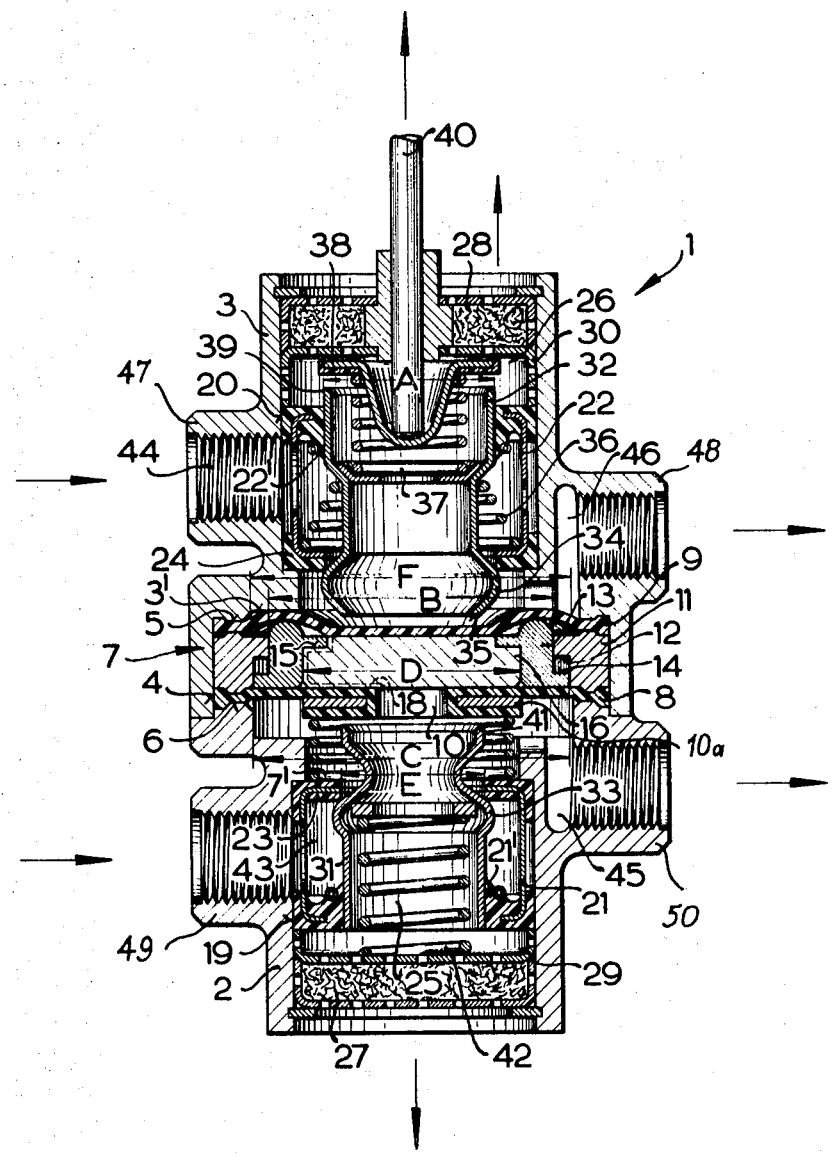

3,606,494
MULTI-CYCLE CONTROL VALVE ASSEMBLY
Kurt Frank, Stuttgart-Feuerbach, and Wilfried Kirchner, Backnang, Germany, assignors to Robert Bosch G.m.b.H., Stuttgart, Germany
Filed Aug. 28, 1969, Ser. No. 853,891
Claims priority, application Germany, Sept. 19, 1968, P 17 80 480.7
Int. Cl. B60t 15/04, 13/26
U.S. Cl. 303—52                                   10 Claims

ABSTRACT OF THE DISCLOSURE

A two-cycle control valve assembly for compressed air comprises a plunger which can be moved axially with reference to the valve body to thereby open a first inlet valve which admits compressed air to a first consumer. The resulting pressure buildup in the body causes a composite diaphragm and a reducing element between the components of the diaphragm to effect the opening of a second inlet valve which admits compressed air to a second consumer. If the pressure buildup fails to materialize on mechanical opening of the first inlet valve, the reducing element effects mechanical opening of the second inlet valve. The resistance which an operator meets to displacement of the plunger is the same regardless of whether both cycles are operative or whether the one or the other cycle is out of commission.

BACKGROUND OF THE INVENTION

The present invention relates to valves in general, and more particularly to improvements in multi-cycle control valve assemblies similar to those known as sequence valves. In such valve assemblies, actuation of a plunger or the like brings about opening or closing of two or more valves in a predetermined sequence.

German DAS No. 1,121,488 discloses a control valve assembly wherein the valve body accommodates a series of valves having valve members located one behind the other and wherein a plunger can be moved to mechanically actuate a first valve whereby such actuation of the first valve initiates a pressure change which effects actuation of a further valve. This assembly further comprises discrete diaphragms each of which serves to guide and to seal one of the valve members. A drawback of the just described assembly is that the two cycles are not always properly sealed from each other.

SUMMARY OF THE INVENTION

An object of the invention is to provide a multi-cycle control valve assembly, particularly a two-cycle control valve assembly, wherein the circuits or cycles are properly sealed from each other and wherein successive valves in the body of the control valve assembly react rapidly and reliably to operation of a plunger or analogous actuating means.

Another object of the invention is to provide a control valve assembly wherein each cycle can be used irrespective of whether the other cycle is operative or not.

A further object of the invention is to provide a two-cycle control valve assembly which can offer to the operation of actuating means the same resistance irrespective of whether the one or the other cycle is ineffective, for example, because the pressure of fluid which is controlled by one of the valves in the control valve assembly drops below a normal pressure.

An additional object of the invention is to provide the control valve assembly with novel means for sealing the cycles from each other.

The improved valve assembly is preferably a two-cycle control valve assembly and comprises a valve body having hollow first and second sections, at least one first and at least one second valve respectively provided in the first and second sections of the body and respectively comprising first and second valve members movable between open and closed positions, actuating means operative to change the position of the first valve member with normally occurring attendant pressure change in the first section, pressure-responsive means including diaphragm means provided in the body between the valve members and normally responsive to the pressure change to thereby change the position of the second valve member in response to the change in position of the first valve member, and reducing means movably installed in the body and operative to effect a change in the position of the second valve member when the change in position of the first valve member fails to effect a pressure change.

In accordance with a more specific feature of the invention, the first valve has a first effective cross-sectional area, the diaphragm means has a larger second effective cross-sectional area, and the reducing means has a third effective cross-sectional area whose size plus the size of the first area at least approximates the size of the second area. The valve body is provided with a first nipple or analogous means which admits a pressurized fluid (e.g., compressed air) against the first area when the first valve member changes its position and effects a pressure change whereby the first valve offers a predetermined resistance to operation of the actuating means (such actuating means preferably includes a plunger which is reciprocable with reference to the body and carries a sealing element which can displace the first valve member). The valve body is further provided with a second nipple or analogous means for admitting a pressurized fluid against such portion of the second effective cross-sectional area by which the size of the second area exceeds the size of the third area when the change in position of the first valve member fails to effect a pressure change whereby the diaphragm means offers to the operation of the actuating means a second resistance which at least approximates the aforementioned predetermined resistance.

The novel features which are considered as characteristic of the invention are set forth in particular in the appended claims. The improved control valve assembly itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single figure is an axial sectional view of a two-cycle control valve assembly which embodies the invention.

DESCRIPTION OF THE PREFERRED EMBODIMENTS

Referring to the drawing in detail, there is shown a two-cycle control valve assembly which includes a valve housing or body 1 comprising two portions or sections 2 and 3. The body 1 is of generally cylindrical shape and its sections 2, 3 are fitted into each other, as at 4, so that the upper end of the lower section 2 is secured to and centered in the adjoining lower end of the upper section 3. These ends of the sections 2, 3 are respectively provided with ring-shaped projections or beads 6, 5 which flank and clampingly engage the adjoining portions of a composite diaphragm 7 including an upper diaphragm 9, a lower diaphragm 8, and a distancing and clamping ring 11 located between the two diaphragms. The upper diaphragm 9 is free of openings but the lower diaphragm 8 comprises a centrally located opening or aperture 10. That part of the diaphragm 8 which defines the aperture 10 is provided with an external reinforcing ring 10a of suitable metallic material. The aforementioned clamping ring 11 of the composite diaphragm 7 is formed with an annular internal shoulder 12 which is in registry with and can serve as a stop for an external annular shoulder 14 provided on an annular member or washer 13. The washer 13 is further provided with an internal annular stop shoulder 15 which serves to limit axial movements of a solid circular plate 16. The plate 16 is accommodated in the interior of the washer 13 and the parts 13, 16 together form a reducing element of the control valve assembly. The plate 16 is formed with a groove or channel 18 which is open at both ends and serves to permit flow of pressurized fluid under certain circumstances which will be described below.

The body sections 2, 3 are respectively provided with axially extending bores 19 and 20 which respectively accommodate lantern-shaped inserts 21 and 22. These inserts consist of sheet metal and their outer portions are provided with elastically deformable sealing rings 21', 22'. The inner portions of the inserts 21, 22 respectively carry elastic sealing rings 23, 24 which constitute valve seats. The parts 21', 22', 23, 24 consist of rubber or elastic synthetic plastic material. The inserts 21, 22 are introduced into the corresponding sections 2, 3 from the respective outer ends of the body 1 and partially surround pressure equalizing air chambers 25, 26, respectively. The outer ends of these chambers are closed by disk-shaped air filters 27, 28 which are introduced into the outermost portions of the respective body sections. Distancing rings 29, 30 are respectively inserted between the air filters 27, 28 and the corresponding inserts 21, 22. These inserts respectively accommodate axially reciprocable tubular or sleeve-like valve members 31, 32 which consist of sheet metal and are sealingly engaged by the respective rings 21', 22'. The conical external surfaces 33, 34 of the valve members 31, 32 cooperate with the seats 23, 24 to form therewith two inlet valves. The lower edge portion 35 of the upper valve member 32 is normally adjacent to but spaced from the upper diaphragm 9. A helical spring 36 reacts against the insert 22 and normally maintains the valve member 32 in the illustrated position. A second helical spring 37 reacts against a washer in the valve member 32 and bears against a cupped sealing element 38 to maintain the flange of this sealing element way from the annular upper edge portion 39 of the valve member 32. The sealing element 38 can be moved axially toward the section 2 by an actuating member or plunger 40 which is guided in a bushing provided therefor in the air filter 28. The parts 38, 39 together constitute a first outlet valve. The outlet valve in the lower section 2 of the valve body 1 includes the diaphragm 8 and the annular upper edge portion 41 of the valve member 31. A helical spring 42 biases the valve member 31 upwardly so that the inlet valve 23, 33 is normally closed. A further helical spring 7' reacts against the seat 23 and bears against the composite diaphragm 7 so that the latter is biased against an internal shoulder 3' of the section 3 to prevent vibrations.

The control valve assembly further comprises two air supply chambers 43 and 44 and two additional chambers 45, 46. The chambers 25, 26, 43, 44, 45 and 46 are disposed in the body 1 in such a way that the chambers 45, 46 are sealed from each other by the composite diaphragm 7 and are respectively separated from chambers 25, 26 by the chambers 43, 44. Thus, the chambers 25, 26 are the outermost chambers, the chambers 45, 46 are the innermost chambers and the chambers 43, 44 are the intermediate chambers.

The external diameter of the cylindrical portion of the upper valve member 32 is shown at A. The character B denotes the external diameter of the washer 13 and the character C denotes the maximum diameter of the shoulder 14 i.e., the maximum diameter of that part of the washer 13 which engages the diaphragm 8. The maximum diameter of that surface on the plate 16 which engages the diaphragm 8 is shown at D and the diameter of the seat 23 is shown at E. The effective outer diameter of the diaphragm 9 is shown at F.

THE OPERATION

When the control valve assembly is idle, the inlet valves 23, 33 and 24, 34 are closed and the outlet valves 8, 41 and 38, 39 are open. Thus, the intermediate chambers 43, 44 are sealed and the innermost chambers 45, 46 communicate with the outermost chambers 25, 26.

If the plunger 40 is thereupon moved downwardly, as viewed in the drawing, the outlet valve 38, 39 is closed in the first step and the inlet valve 24, 34 is opened in the next-following step. Compressed gas (e.g., air) then flows from a fluid-admitting nipple 47 (which is in communication with the intermediate chamber 44) into the innermost chamber 46 by way of the inlet valve 24, 34 and from the chamber 46 to a first consumer (first cycle) by way of a second nipple 48. At the same time, the pressure upon the reducing element 13, 16 rises and since the effective surface (diameter B) of this element is rather large, the reducing element 13, 16 moves downwardly, as viewed in the drawing, as soon as the inlet valve 24, 34 opens. The diaphragm 8 approaches the axially movable seat 41 of the outlet valve 8, 41 and this valve closes while the valve member 31 moves downwardly to open the inlet valve 23, 33.

The pressure of gas in the innermost chamber 46 acts on the effective area of the outlet valve 38, 39 (diameter A) and the thus produced resistance is felt by the person or instrument which holds the plunger 40 in depressed position.

Due to the fact that the area between the diameters C and E is smaller than the area having the diameter B, the delay with which the lower inlet valve 23, 33 opens following opening of the upper inlet valve 24, 34 is rather short. Thus, the buildup of pressure in the second (lower) part of the control valve lags behind the buildup of pressure in the upper part by a very short interval of time whereupon the pressure in the lower part equals the pressure in the upper part. The initial rise in pressure may be in the range of 0.2 atmosphere superatmospheric pressure. By appropriate selection of dimensions of the reducing element 13, 16, the designer of the control valve can determine in advance the manner in which the pressures build up in the two parts of the body 1. When the lower inlet valve 23, 33 is open, compressed gas flows from a fluid-admitting nippple 49, through the chambers 43, 45 and is conveyed to a second consumer in the second cycle by way of a further nipple 50.

If the second cycle is out of commission, the valves in the upper part of the body 1 operate in the same way as described above. If the first cycle is out of commission, the valves in the lower part are actuated mechanically in that the lower edge portion 35 of the valve member 32 engages the reducing element 13, 16 from above and pushes the plate 16 downwardly. Compressed gas which flows from the chamber 43 into the chamber 45 exerts a pressure against the annular surface between the diameters D and E; this surface is the reaction surface of the control valve assembly and the resulting resistance is felt by the person or instrument which presses the plunger 40. The area between the diameters D and E is identical with the area having the diameter A. The area between the diameters C and D does not participate in generation of resistance to depression of the plunger 40 because the washer 13 bears against the shoulder 3' of the section 3 through the intermediary of the diaphragm 9. It will be noted that the resistance which the plunger 40 meets to movement into the interior of the body 1 is the same when the entire control valve assembly is fully operative or when the one or the other cycle is out of commission.

If the diaphragm 9 happens to leak, such leak is likely to occur in the region of the diameter B or in the region where the marginal portion of the diaphragm 9 is clamped. Gas which passes through the leaky diaphragm 9 in response to depression of the plunger 40 passes through the groove 18 in the plate 16 and enters the chamber 25 in the lower section 2 to escape from the chamber 25 with attendant generation of noises which informs the operator that the diaphragm 9 has developed a leak. If desired, the control valve assembly may be equipped with one or more pressure gauges which indicate the drop in pressure in response to uncontrolled escape of gases.

The control valve assembly has a preferred use in braking systems especially in two circuit brake systems of vehicle braking systems. In such case the fluid issuing from the nipple 48 serves to operate a first pneumatic brake cylinder and the fluid issuing from the nipple 50 serves to operate a second pneumatic brake cylinder. The nipples 47 and 49 are connected to separate sources of compressed gas.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims:

1. In a multi-cycle control valve assembly, a combination comprising a valve body having hollow first and second sections; at least one first and at least one second valve respectively provided in said first and second sections and respectively comprising first and second valve members movable between open and closed positions; actuating means operative to change the position of said first valve member with normally occurring attendant pressure change in said first section; pressure-responsive means including diaphragm means provided in said body between said valve members and normally responsive to said pressure change to change the position of said second valve member in response to said change in position of the first valve member; and reducing means movably installed in said body and operative to effect said change in position of said second valve member when the change in position of said first valve member fails to effect said pressure change, said diaphragm means comprising two discrete diaphragms and said reducing means being located between said diaphragms.

2. A combination as defined in claim 1, wherein said first valve has a first effective cross-sectional area and said diaphragm means has a larger second effective cross-sectional area, said reducing means having a third effective cross-sectional area and the combined size of said first and third areas being substantially equal to the size of said second area, said body being provided with first means which admits a pressurized fluid against said first area when said first valve member changes its position and effects said pressure change whereby said first valve offers a predetermined resistance to operation of said actuating means, and with second means for admitting a pressurized fluid against such portion of said second area by which the latter exceeds said third area when the change in position of said first valve member fails to effect said pressure change whereby said diaphragm means offers to the operation of said actuating means a second resistance which at least approximates said first resistance.

3. A combination as defined in claim 1, wherein said reducing means comprises an annular outer member and a solid inner member surrounded by said outer member.

4. A combination as defined in claim 3, wherein said inner member is movable axially of said outer member and said outer member comprising stop means for limiting axial movements of said inner member.

5. A combination as defined in claim 3, wherein said outer member is movable axially with reference to said body and wherein said diaphragm means comprises distancing means for said discrete diaphragms said distancing means including stop means for said outer member.

6. A combination as defined in claim 1, wherein said actuating means comprises a plunger which is reciprocable with reference to said body and said first valve further comprises a sealing element provided on said plunger and arranged to sealingly engage said first valve member in response to movement of said plunger from a first to a second position to thereby effect said change in position of said first valve member by way of said sealing element.

7. A combination as defined in claim 6, wherein said first valve member and said sealing element constitute an outlet valve which is respectively open and closed in first and second positions of said plunger.

8. A combinattion as defined in claim 1, wherein each of said valves defines with the corresponding section of said body a first chamber, a second chamber in communication with the atmosphere, and a fluid-admitting third chamber, said first chambers being located at the opposite sides of said diaphragm means and communicating with the respective second chambers prior to changes in positions of the corresponding valve members, each of said valve members establishing communication between the corresponding first and third chambers in response to said change in the position thereof.

9. In a multi-cycle control valve assembly, a combination comprising a valve body having hollow first and second sections, each of said sections defining a chamber having an open end; at least one first and at least one second valve respectively provided in said first and second sections and respectively comprising first and second valve members movable between open and closed positions, each of said valve members comprising a sleeve of sheet metal and each of said valves further comprising an annular seat mounted in the respective section, said sleeves comprising conical portions movable into and away from sealing engagement with the respective seats; substantially lantern-shaped inserts provided in said sections and supporting the respective seats, said inserts being removable from said body by way of the open ends of the respective chambers; air filters provided in said chambers between said inserts and the open ends of the respective chambers; actuating means operative to change the position of said first valve member with normally occurring attendant pressure change in said first section; pressure-responsive means including diaphragm means provided in said body between said valve members and normally responsive to said pressure change to change the position of said second valve member in response to said change in position of the first valve member; and reducing means movably installed in said body and operative to effect said change in position of said second valve member when the change in position of said first valve member fails to effect said pressure change.

10. A combination as defined in claim 9, further comprising distancing members provided in said chambers between said inserts and the respective air filters.

References Cited

UNITED STATES PATENTS

| | | | |
|---|---|---|---|
| 3,291,539 | 12/1966 | Bueler | 303—52 |
| 3,355,223 | 11/1967 | Klimek | 303—52 |
| 3,359,043 | 12/1967 | Papin | 303—52 |
| 3,366,424 | 1/1968 | Edwards | 303—52 |

FOREIGN PATENTS

| | | | |
|---|---|---|---|
| 856,638 | 12/1960 | Great Britain | 303—52 |
| 1,156,653 | 5/1958 | France | 303—52 |

MILTON BUCHLER, Primary Examiner

J. J. McLAUGHLIN, Assistant Examiner

U.S. Cl. X.R.

137—627.5; 303—40, 54